United States Patent [19]
Heller et al.

[11] 4,037,413
[45] July 26, 1977

[54] POWER PLANT WITH A CLOSED CYCLE COMPRISING A GAS TURBINE AND A WORK GAS COOLING HEAT EXCHANGER

[75] Inventors: László Heller; László Forgó; Zoltán Szabó, all of Budapest, Hungary

[73] Assignee: Energiagazdalkodasi Intezet, Hungary

[21] Appl. No.: 635,451

[22] Filed: Nov. 26, 1975

[30] Foreign Application Priority Data
Dec. 9, 1974 Hungary .............................. HE 670

[51] Int. Cl.² .............................................. F01K 23/04
[52] U.S. Cl. .......................................... 60/655; 60/688; 60/690
[58] Field of Search ................. 60/655, 688, 690, 692, 60/693

[56] References Cited
U.S. PATENT DOCUMENTS

| | | | |
|---|---|---|---|
| 3,257,806 | 6/1966 | Stahl | 60/655 |
| 3,266,246 | 8/1966 | Heller et al. | 60/655 |

*Primary Examiner*—Allen M. Ostrager
*Attorney, Agent, or Firm*—Blum, Moscovitz, Friedman & Kaplan

[57] ABSTRACT

A heat exchanger in a close cycle gas turbine power plant has, on its heat abduction side, a system of cooling units connected to it by means of which the efficiency of the plant is considerably increased. Such units consist of evaporators and vapor turbines with condensers and air coolers, the vapor turbines being driven by vapors generated in the evaporators. The latter, in turn, are heated by the heat abduction side of the heat exchanger in the main cycle. The exhaust vapors are precipitated in condensers and cooled down by air coolers and re-coolers and partly circulated back to the heat abduction side of the heat exchanger in the main cycle.

6 Claims, 3 Drawing Figures

POWER PLANT WITH A CLOSED CYCLE COMPRISING A GAS TURBINE AND A WORK GAS COOLING HEAT EXCHANGER

BACKGROUND OF THE INVENTION

As is known, closed cycles gas turbine power plants consist of a heat source, a compressor, a gas turbine and a heat exchanger for cooling the work gas in the cycle. The hot gas having performed work in the gas turbine and exhausted therefrom is cooled by the heat exchanger is preparation for being recompressed and recycled. Such gas turbine power plants of the closed cycle type may be complemented with further coolers, if necessary, in which the gas will be cooled between individual compressor stages while being compressed. Moreover, it is possible to employ recuperators which serve to convey the heat of exhaust gases partly to the compressed working gas.

Power plants with gas turbines which work in closed cycles are particularly preferable where the nature of the heat source permits heat transmission between heat source and gas only through heat exchangers. Combustion of solid combustibles, nuclear reactors or the like may be cited as examples. The temperature limits of the cycles which are performed in power plants with closed cycle gas turbines will naturally be selected according to various technical and economical conditions. If such conditions should be met with, the abduction of waste heat of the cycle would very often occur at temperatures which are considerably higher than the ambient temperature. This can occur e.g., if compression takes place without intermediate cooling and/or too high temperature differences prevail in a recuperator which is intended to return a part of the heat content of the work gas after compression has taken place. Such high temperature differences are due to insufficient recuperator surfaces which, in turn, result from lack of space. Such may be the case e.g. where nuclear reactors are accommodated in prestressed concrete reactor vessles for safety reasons.

If the heat of the work gas is abducted at a relatively high temperature, the exploitation of energy which is latent in the temperature differences referred to above is already justified.

The invention aims at exploitation of such energy.

SUMMARY OF THE INVENTION

The main object of the present invention consists in the abduction and exploitation of the waste heat of the work gas in a closed cycle gas turbine power plant without interfering with the gas turbine of the latter. In compliance with the main feature of the invention, such objects will be obtained by the heat abduction side of the work gas cooling heat exchanger having a varpour turbine cycle connected to it the vapour turbine of which is supplied with vapours from the vapour chamber of an evaporator. Thus, the invention consists in a closed cycle power plant comprising a gas turbine with an intake and an exhaust, a work gas cooling heat exchanger having a heater side and a cooler side, said heater side of said heat exchanger being connected between said intake and said exhaust of said gas turbine, an evaporator having a liquid chamber and a vapour chamber, said liquid chamber of said evaporator being connected to said cooler side of said heat exchanger through an air cooler, and said vapour chamber of said evaporator being connected to said cooler side of said heat exchanger through a condensation vapour turbine. According to calculations and test results, such power plant will yield energies with are from 7 to 15% higher than the energy output of hitherto known power plants with closed cycle gas turbines.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
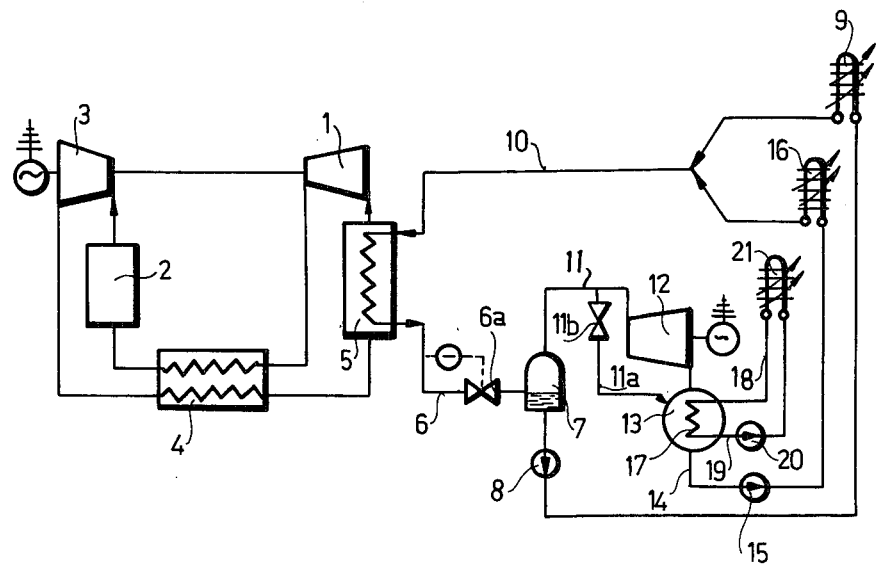
FIG. 1 is an embodiment of the present invention including a single evaporator in series with a vapour turbine and using air coolers throughout.

The invention will hereinafter be described in closer details by taking reference to FIGS. 1 to 3 of the drawing which show connection diagrams of various exemplified embodiments of the power plant according to the invention.

In the drawing, a power plant comprising a closed cycle gas turbine consists of a compressor 1, a heat source 2 and a gas turbine 3. The exhaust of the gas turbine 3 is connected through a recuperator 4 and a work gas cooling heat exchanger 5 with the inlet of the compressor 1. The heat abduction side of the recuperator 4 lies in a pipe conduit comprising the outlet of the compressor 1, the heat source 2 and the inlet of the gas turbine 3.

In compliance with the main features of the present invention, the heating side of the work gas cooling heat exchanger 5 is connected through a pipe conduit 6 to an evaporator 7. The liquid chamber of the evaporator 7 is connected through a pump 8 to an air cooler 9 which, through a pipe conduit 10, is connected to the heat abduction side of the work gas cooling heat exchanger 5.

A pressure reduction valve 6a may be provided between the work gas cooling heat exchanger 5 and the evaporator 7 which is controlled dependent on the pressure prevailing in the pipe conduit 6 as indicated by broken lines in the drawing.

With the represented embodiment illustrated in FIG. 1, the vapour chamber of the evaporator 7 is connected with the inlet of a condensation vapour turbine 12 by means of a pipe conduit 11. The outlet of the vapour turbine 12 is connected, through a surface condenser 13, a pipe conduit 14 and a pump 15, to an air cooler 16 which opens into the pipe conduit 10.

The pipe conduit 11 which connects the evaporator 7 with the vapour turbine 12 has a branching off 11a comprising a closing valve 11b and bypassing the vapour turbine 12.

The heat abduction side of the surfce condensers 13 lies in a pipe conduit 18 with a pump 20 and an air cooler 21.

In operation, the work gas compressed in the compressor 1 flows through the recuperator 4 and the heat source 2 into the gas turbine 3 from which it flows into the heat yielding side of the recuperator 4 and from here into the work gas cooling heat exchanger 5. The work gas cools down and flows from the heat exchanger 5 again into the compressor 1.

Water flowing as cooling medium through the heat abduction side of the work gas cooling heat exchanger 5 is introduced through the pipe conduit 6 and the pressure reduction valve 6a into the evaporator 7 where it evaporates. An amount of water which corresponds to the pressure at which evaporation takes place is carried by the pump 8 to the air cooler 9 where the temperature of the water decreases and from where the cooled down water flows through the pipe conduit 10 again to the heat abduction side of the work gas cooling heat exchanger 5 for the purpose of cooling down the work gas arriving from the recuperator 4 to the heater side of the former.

At closed position of the valve 11b in the bypassing pipe conduit 11a the vapour generated in the evaporator 7 flows into the vapour turbine 12 from which it is introduced into and condensed in the surface condenser 13. The condensate will be circulated by the pump 15 through the pipe conduit 14 and the air cooler 16 from which it flows through the pipe conduit 10 back again to the work gas cooling heat exchanger 5.

The cooling medium of the surface condenser 13 is circulated by the pump 20 through the air cooler 21 for being cooled down.

If the vapour introduced into the vapour turbine 12 cannot be consumed by the latter, or else the vapour turbine 12 has, for some reason or other, to be disconnected, the closure valve 11b in the bypassingg pipe conduit 11a will be opened so that the vapour generated in the evaporator 7 may flow directly into the surface condenser 13.

By controlling the pressure-reducing valve 6a dependent on the pressure prevailing in the pipe conduit 6, the pressure prevailing at the heat abduction side of the work gas heat exchanger 5 can be maintained at a contant value.

The air cooler 16 may be dispensed with for reasons of investment costs. Then, the condensate coming from the surface condenser 13 will be directly admixed to the liquid circulated by the pump 8 upstream of the air cooler 9.

Figure 2:
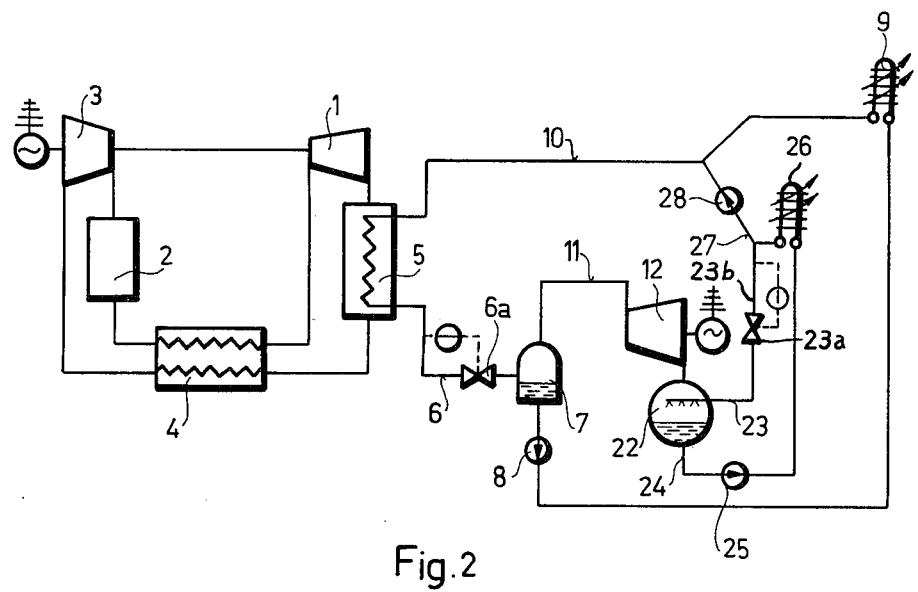
FIG. 2 is a second embodiment of the present invention in which a mixing condenser is employed in combination with air coolers.

The embodiment shown in FIG. 2 differs from the previous one in that a mixing condenser 22 is employed rather than a surface condenser, the jet conduit of the mixing condenser being designated by the reference character 23. The outlet of the mixing condenser 22 is connected through a pipe conduit 24, a pump 25 and an air cooler 26, to the jet conduit 23. The jet conduit 23 has a branching-off 27. The latter leads into the pipe conduit 10 which, in turn, is connected with the work gas cooling heat exchanger 5. The branching-off 27 includes a pump 28.

The operation of the above-described embodiment of the power plant according to the invention differs from that of the previous one in that the mixture consisting of water injected through the jet conduit 23 and of the vapour exhausted from the vapour turbine 12 and condensed in the mixing condenser 22 is circulated by the pump 25 through the air cooler 26. One portion of the circulated mixture is conveyed back into the mixing condenser 22 in the form of injected water. Another portion which corresponds to the amount of precipitated vapour is conveyed by the pump 28 back through the branching-off 27 and the pipe conduit 10 to the heat abduction side of the work gas cooling heat exchanger 5.

Furthermore, it is possible to separate a portion of liquid from the liquid flow in the jet conduit 23 which corresponds to the amount of vapour introduced into the pipe conduit 11 and to recool it in an individual heat exchanger. However, it is also possible to unite the liquid flows conveyed by the pump 25 and the pump 8, and to recool both in the same air cooler.

The jet conduit 23 may comprise a control valve 23a which is controlled dependent on the pressure prevailing in the pipe conduit 23b downstream from the air cooler 26 as shown in FIG. 2 by broken lines. Thus, it is possible to adjust the pressure prevailing in the air cooler 26, and the amount of water introduced through the jet conduit 23, respectively.

Figure 3:
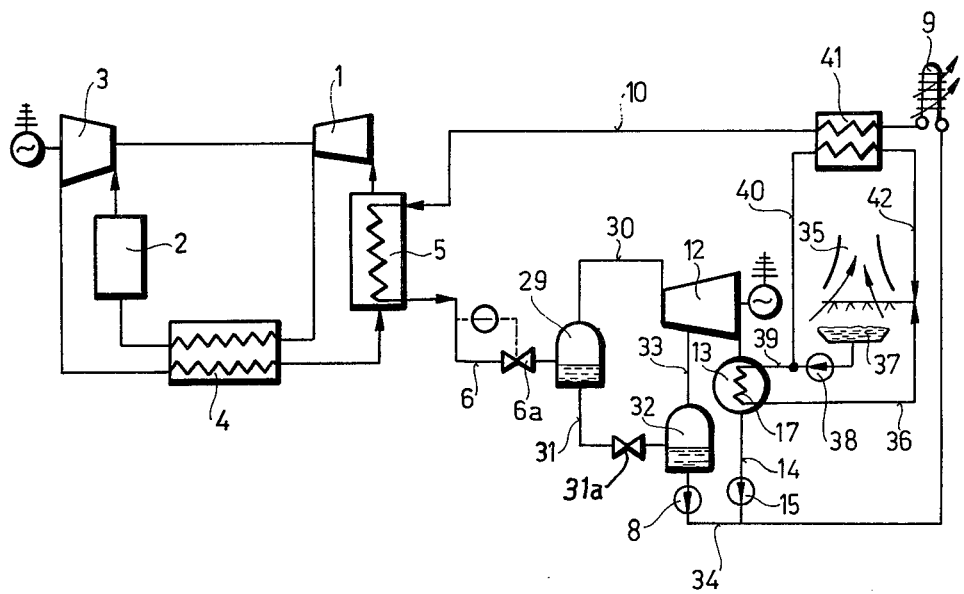
FIG. 3 is a third embodiment of the present invention employing a plurality of evaporators connected with a plurality of stages in a vapour-driven turbine.

FIG. 3 represents an embodiment in which evaporation occurs in more than one stage. In the instant case two evaporators 29 and 32 are employed rather than a single evaporator 7 of the hitherto-described embodiments. The liquid chamber of the evaporator 29 is connected through a pipe conduit 31 and a control valve 31a with the evaporator 32. The vapour chamber of the evaporator 29 is connected through a pipe conduit 30 with the inlet of the vapour turbine 12. The vapour chamber of the evaporator 32 is connected with an intermediate stage of the vapour turbine 12 through a pipe conduit 33. Thus, the vapour chambers of the evaporators 29 and 32 are connected to different stages of the vapour turbine 12.

The outlet of the surface condenser 13 is connected to pipe conduit 34 through the pipe conduit 14 and the pump 15. The pipe conduit 34 connects, in turn, the liquid chamber of the evaporator 32 with the air cooler 9.

Furthermore, the surface condenser 13 which is provided downstream from the vapour turbine 12 is connected to a wet cooling tower 35 by means of a pipe conduit 36. The latter is connected in parallel to a pipe circuit composed of pipe conduits 40 and 42, said pipe circuit going through the heat abduction side of a recooler 41 which is provided downstream the air cooler 9. This is, in turn, downstream the liquid chamber of the evaporator 32. A water collecting basin 37 of the wet cooling tower 35 is connected through a pipe conduit 39 and a pump 38 to the heat abduction side 17 of the surface condenser 13.

In operation, evaporation takes place in a pair of stages. The vapour generated in the evaporator 29 in the first stage flows through the pipe conduit 30 into the high pressure stage of the vapour turbine 12 where it expands to a pressure which is determined by the control valve 31a in the pipe conduit 31. On the other hand, the vapour generated in the evaporator 32 flows through the pipe conduit 33 into the intermediate stage of the vapour turbine 12 and expands together with the previously expanded vapour to a pressure which is determined by the surface condenser 13. Thus, the energy output is obviously increased with respect to the energy output associated with single stage evaporation.

Furthermore, the cooling water of the surface condenser 13 cools down due to contact with atmospheric air in the wet cooling tower 35. The cooled down water is collected in the water collecting basin 37. The collected water will be returned to the surface condenser 13 by means of a pump 38. Simultaneously therewith, a portion of the water withdrawn from the water collecting basin 37 will circulate through the pipe conduit 40 and the pipe conduit 42 along the heat abduction side of the recooler 41 in counter-current with the water withdrawn from the air cooler 9. Thus, the temperature of the water withdrawn from the air cooler 9 is additionally reduced so that also the temperature of the work gas leaving the work gas cooling heat exchanger 5 can further be decreased whereby the efficiency of the power plant with closed cycle gas turbines will correspondingly increase.

It will be apparent that the embodiment illustrated in FIG. 3 performs cooling by means of a system of units in which each unit works under conditions most appropriate to its nature. The result is that, in comparison with known systems employing only evaporation cooling towers, the water requirement may be decreased by as much as 50 to 55%. This means that the employment of the power plant according to the invention is especially justified where water is sparse and/or plants operate with closed cycles.

The work gas cooling heat exchanger 5 may, otherwise, be subdivided into several stages and such subdivision will particularly be preferable in cases where the gas turbine power plant operates without recuperators. The, e.g. various circuits comprising regular and evaporation type vapour turbines may suitably be combined with one another.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A closed cycle power plant, comprising a gas turbine having an intake and an exhaust, a work gas cooling heat exchanger having a heater side and a heat abduction side, said heater side of said heat exchanger being connected between said intake and said exhaust of said gas turbine, an air cooler, an evaporator having a liquid chamber and a vapour chamber, said liquid chamber of said evaporator being connected to said heat abduction side of said heat exchanger through said air cooler, said vapour chamber of said evaporator being also connected to said heat abduction side of said heat exchanger through a condensation vapour turbine.

2. The closed cycle power plant as claimed in claim 1, further comprising a pipe conduit bypassing said vapour turbine.

3. The closed cycle power plant as claimed in claim 1, wherein said evaporator has a plurality of vapour chambers and said vapour turbine has a plurality of stages and each of said vapour chambers is connected to a different stage of said vapour turbine.

4. The closed cycle power plant as claimed in claim 1, further comprising a mixing condenser and cooler means connected in series with and downstream from said vapour turbine, said cooler means connected with said mixing condenser comprising a dry air cooler and being provided with a branch connected to said heat abduction side of said work gas cooling heat exchanger.

5. The closed cycle power plant as claimed in claim 1, further comprising valve means between said heat abduction side of said work gas cooling heat exchanger and said evaporator, and means for controlling said valve means dependent on the pressure prevailing in the heat abduction side of said work medium cooling heat exchanger.

6. The closed cycle power plant as claimed in claim 1, further comprising a surface condenser with a cooler side connected downstream from said vapour turbine, a wet air cooler connected to said cooler side of said surface condenser, a dry air cooler downstream said liquid chamber of said evporator, a recooler having a cooler side and a heater side, said cooler side of said recooler being arranged downstream said dry air cooler, and pipe conduit means connecting said heater side of said recooler to said cooler side of said surface condenser said pipe conduit means bypassing said wet air cooler.

* * * * *